United States Patent
Vinson et al.

(10) Patent No.: US 8,930,978 B2
(45) Date of Patent: *Jan. 6, 2015

(54) AGGREGATION-BASED METHODS FOR DETECTION AND CORRECTION OF TELEVISION VIEWERSHIP ABERRATIONS

(71) Applicant: Rentrak Corporation, Portland, OR (US)

(72) Inventors: Michael Vinson, Piedmont, CA (US); Kim Hadfield, Vancouver, WA (US); Amir Yazdani, Portland, OR (US); Aaron Harsh, Portland, OR (US); Maria Loper, Portland, OR (US)

(73) Assignee: Rentrak Corporation, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/018,250

(22) Filed: Sep. 4, 2013

(65) Prior Publication Data

US 2014/0013345 A1 Jan. 9, 2014

Related U.S. Application Data (63) Continuation-in-part of application No. 13/543,770, filed on Jul. 6, 2012, now abandoned.

(60) Provisional application No. 61/504,980, filed on Jul. 6, 2011.

(51) Int. Cl.
*H04N 7/16* (2011.01)
*H04N 21/442* (2011.01)
(Continued)

(52) U.S. Cl.
CPC ......... *H04N 21/44213* (2013.01); *H04H 60/61* (2013.01); *H04N 21/2407* (2013.01); *H04N 21/252* (2013.01); *H04H 60/31* (2013.01); *H04H 60/66* (2013.01); *H04N 21/44222* (2013.01)

USPC ............... 725/14; 725/9; 725/19; 705/7.29; 705/7.32; 705/7.33; 705/14.43; 705/14.44; 705/14.52

(58) Field of Classification Search
CPC .............. H04N 21/44213; H04N 21/44222; H04N 21/252; H04N 21/2407; H04H 60/61; H04H 60/66; H04H 60/31
USPC ............... 725/14, 19, 9; 705/7.29, 7.32, 7.33, 705/14.43, 14.44, 14.52
See application file for complete search history.

(56) References Cited

U.S. PATENT DOCUMENTS 5,842,199 A * 11/1998 Miller et al. ........................... 1/1
5,956,693 A * 9/1999 Geerlings .................. 705/14.53

(Continued)

OTHER PUBLICATIONS

Rudolph J. Freund and William J. Wilson, Regression Analysis, Jun. 1998.*

(Continued)

*Primary Examiner* — Hoang-Vu A Nguyen-Ba
(74) *Attorney, Agent, or Firm* — Perkins Coie LLP (57) ABSTRACT

Various of the disclosed embodiments contemplate television viewing behavior data collected from a plurality of television set top boxes by using aggregation to detect an excess or a deficit in viewership for a group of television set top boxes. In some embodiments, a group of set top boxes can be associated with a particular television service provider, cable television head-end, or data warehouse. Additionally, some embodiments can clean television viewing behavior data by detecting and correcting aberrant viewership in a time series, e.g. based on a weekly or an approximately monthly frequency. In some embodiments, the aberrant viewership can be detected by calculating a minimum expected number of viewers for a day and comparing it to the actual number of households that reported viewers for that day.

15 Claims, 6 Drawing Sheets

(51) Int. Cl.
*H04H 60/61* (2008.01)
*H04N 21/24* (2011.01)
*H04N 21/25* (2011.01)
*H04H 60/31* (2008.01)
*H04H 60/66* (2008.01)
*G06Q 10/00* (2012.01)
*G06Q 30/00* (2012.01)

(56) References Cited

U.S. PATENT DOCUMENTS 6,055,491 A * 4/2000 Biliris et al. .................. 702/176
6,216,129 B1 * 4/2001 Eldering ..................... 705/36 R
2007/0198327 A1 8/2007 Yazdani et al.
2012/0254910 A1 * 10/2012 Donoghue et al. .............. 725/14
2012/0260280 A1 10/2012 Harsh et al.
2012/0278828 A1 11/2012 Yazdani et al.
2013/0014147 A1 1/2013 Hadfield et al.
2013/0014148 A1 1/2013 Vinson et al.

OTHER PUBLICATIONS

Klingenberg, L., "Frequency Domain Using Excel," San Francisco State University School of Engineering, Apr. 2005, 5 pages.

* cited by examiner

AGGREGATION-BASED METHODS FOR DETECTION AND CORRECTION OF TELEVISION VIEWERSHIP ABERRATIONS

CROSS-REFERENCE TO RELATED APPLICATIONS

This application claims the benefit of and is a continuation-in-part of U.S. patent application Ser. No. 13/543,770, filed Jul. 6, 2012, which is a nonprovisional application of U.S. Provisional Patent Application No. 61/504,980, filed Jul. 6, 2011. The content of each of these applications is incorporated herein by reference in its entirety for all purposes.

BACKGROUND

Various problems exist for utilizing collected television set top box ("STB") data for the analysis of television viewing behavior, such as problems related to the precision or the reliability of the data. Different collection processes and steps utilized by different television service providers can introduce different types of errors in the collected television viewing data, (e.g., data may be lost, duplicated, corrupted, etc.). Sources of television viewing data include data collected from a group of STBs which are transmitted to network nodes, such as regional head ends of a cable television service provider. Some nodes, in turn, send data along to other parent nodes up a hierarchy of nodes, and the data is processed along the way. At some point up the hierarchy of nodes, a television service provider collects data for its entire television viewing footprint.

The information collection process differs depending on which television distribution network is utilized by the television service provider. For example, where television service providers utilize a digital broadcast satellite system or a cable system, third parties can then collect and combine television viewing data from multiple television service providers. The number of subscribers for a television service provider can be as high as tens of millions. Each of these different steps provides an opportunity for data corruption, accidental data duplication, or data loss, such as dropped data, known as "data drops". Errors that occur higher up in the collection hierarchy can cause particularly severe problems with regard to the accuracy of the data.

A need exists for a system that overcomes the foregoing problems. Overall, the examples herein of prior or related systems and their associated limitations are intended to be illustrative and not exclusive. Other limitations of existing or prior systems will become apparent to those of skill in the art upon reading the following Detailed Description.

DETAILED DESCRIPTION

In an embodiment of the disclosed technology, a system cleans television viewing behavior data. The data is collected from a plurality of television set top boxes by using aggregation to detect an excess or deficit in viewership for a group of television set top boxes. In various aspects, the group of set top boxes is associated with a particular television service provider, cable television head-end, or data warehouse.

Additionally or alternatively, the system can clean television viewing behavior data by detecting and correcting aberrant viewership in a time series. In some embodiments, the aberrant viewership is detected by calculating a range of an expected number of viewers for a day, and comparing the range to an actual number of viewers for that day as reported by the observed households. If the actual number of viewers on that day is outside the range of the expected number of viewers, an aberration is identified in some embodiments. In some embodiments, the range of the expected number of viewers is calculated by using a linear regression model and applying a threshold.

In some embodiments, the aberrant viewership is detected by calculating a minimum of the expected number of viewers for a day and comparing the minimum to the actual number of households that reported viewers for that day. If the actual number of viewers on that day is below the minimum of the expected number of viewers, an aberration is identified. In embodiments, the range of the expected number of viewers is calculated by using a linear regression model and applying a threshold. Thus, in some embodiments the model is taken from historical data of the same time series.

The linear regression model in each of the above-described embodiments can be calculated from historic viewing data, which can be weighted or filtered according to a periodically recurring time period (e.g., a periodic one week long recurring period, so that the comparison is of the same day-of-the-week: Sundays compared to Sundays, Mondays to Mondays, etc.). The detection process can be repeated for other days in a time period, or for different time periods (monthly, annually, etc).

In some embodiments of the disclosed technology, the system can store the cleaned television viewing behavior data in a non-transitory computer readable storage medium. The computer readable storage medium can then be distributed to a third-party, who can use the cleaned television viewing behavior data for analyzing television viewing behavior with a high degree of accuracy and reliability. In some embodiments, all or part of the processes disclosed herein are implemented by computer-executable instructions that are stored in a non-transitory computer readable storage medium.

Various embodiments will now be described with reference to the figures. The following description provides specific details for a thorough understanding and enabling description of some embodiments. One skilled in the art will understand, however, that the various embodiments can be practiced without many of these details. Additionally, some well-known structures or functions may not be shown or described in detail, so as to avoid unnecessarily obscuring the relevant description of the various embodiments.

The terminology used in the description presented herein is intended to be interpreted in its broadest reasonable manner, even though it is being used in conjunction with a detailed description of certain specific embodiments. Certain terms may even be emphasized herein; however, any terminology intended to be interpreted in any restricted manner will be overtly and specifically defined as such in this Detailed Description section.

Suitable System

Figure 1:
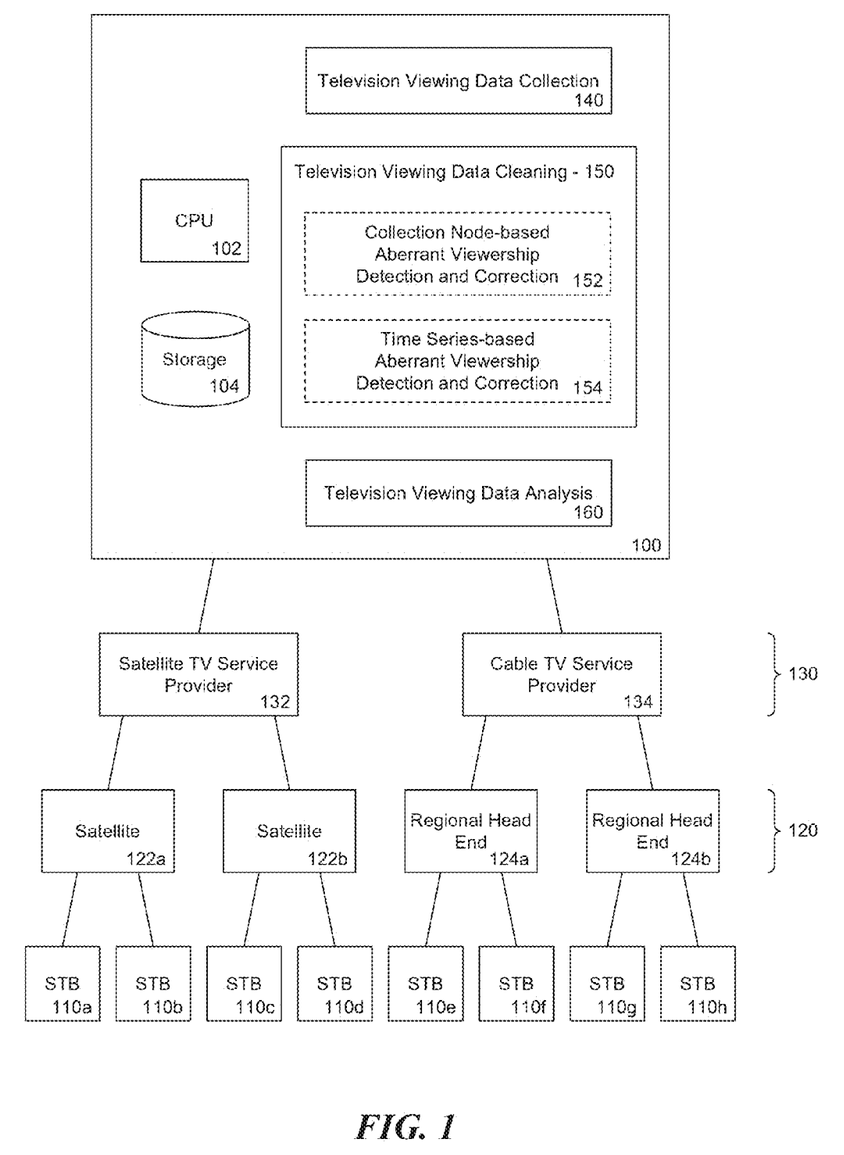
FIG. 1 is a block diagram illustrating an exemplary system for cleaning television viewing data by using aggregation to detect and correct aberrations of television viewership.

FIG. 1 is a block diagram illustrating an exemplary system 100 for cleaning television viewing data by using aggregation to detect and correct aberrations of television viewership. The system 100 utilizes a central processing unit (CPU) 102 that executes instructions implementing at least some components of the system, and a storage device 104 that stores the instructions. The components can include a television viewing data collection component 140, a television viewing data cleaning component 150, and a television viewing data analysis component 160. The components 140, 150, and 160 can be in the form of software (such as functions, objects, subroutines, and applications), and/or hardware (such as embedded instructions). Some embodiments of the system can utilize multiple processors and/or storage devices. For the sake of brevity, although FIG. 1 illustrates a single CPU 102 and a single storage device 104, one will recognize that multiple such components may be utilized in other embodiments.

The television viewing data collection component 140 can collect television viewing behavior data that represents the viewing behavior of many television viewers (also known as a viewing audience). The viewing behavior data can be buffered in television set top boxes (STBs) 110a-110h, which decode video signals for television sets. In some embodiments, an STB 110 can be physically housed in a television set. In some embodiments, an STB 110 can be physically separated from the television set. In some embodiments, the STB 110 may be a special-purpose video decoder, a device with additional functionality (such as a Digital Video Recording device or other player), a video gaming system, a display device itself, a digital television, a personal computer, etc. Accordingly, one will recognize that the viewing device may itself serve as an STB in some embodiments. One will readily recognize contemplated variations to the particulars described above. For example, in some embodiments, viewing behavior data may be received/processed using non-STB devices, e.g., from a data collection intermediary, directly via the viewing device, by inference from corresponding data, etc.

An STB 110 that is physically separated can send decoded audio and video signals to a television set via one or more cables, such as a coaxial cable carrying an analog signal, a High Definition Multimedia Interface cable carrying a digital signal, etc.

The STBs 110a-110h receive video signals from television network distribution nodes 120, including nodes representing television service providers 130. In the case of a satellite television service provider 132, the STBs 110a-110d can receive video signals from the satellite television service provider's 132 satellites 122a and 122b. The satellite television service provider 132 can also be known as a direct broadcast satellite (DBS) service provider. Examples of DBS service providers include: DirecTV Group Inc. of El Segundo, Calif.; and Dish Network Corporation of Englewood, Colo.

In the case of a cable television service provider 134, the STBs 110e-110h can receive video signals from the cable television service provider's 134 regional head ends 124a and 124b. A cable television service provider 134 with multiple regional head ends 124a and 124b is also known as a multiple system operator (MSO). Examples of MSO's include: Comcast Corporation of Philadelphia, Pa.; Time Warner Cable Inc. of New York, N.Y.; and Cox Communications of Atlanta, Ga.

Although not illustrated in FIG. 1 for the sake of brevity, a television signal can be distributed through a deep hierarchy of nodes on its way to STB 110. For example, a cable television signal can pass from a regional head-end 124 through a fiber optic trunk line, a series of distribution amplifiers, pole-mounted fiber-optic nodes, and a coaxial line on its way to one of the STBs 110e-110h.

In some embodiments an STB 100 periodically sends its viewing data (sometimes in the form of channel-change events, or "tunes") back through the same network that it used to receive its television viewing signals. In other cases, an STB sends its viewing data back through a different network to be collected by, for example, a television service provider 130 or a data warehouse, on its way to the system 100. For example, an STB that receives television viewing data from a television "receive only" satellite might send its viewing data to the satellite TV service provider 132 using alternate data collection nodes that the STB is connected to. Examples of alternate data collection nodes include: nodes on the Internet, nodes on a wireless terrestrial network, nodes on a public-switched telephone network, nodes on a power line communication system, etc.

Although an STB 110 can be located on a customer's premises, it may or may not be customer-owned. In many cases, an STB 110 is owned by a television service provider 130 and leased to the customer. However, in some cases, a customer may purchase, own, and use an STB that the television service provider supports. Moreover, new STB models are frequently introduced with new features demanded by the marketplace (such as Digital Video Recording, additional tuners, etc.). Accordingly, some television service providers 130 may support a wide variety of different manufacturers, models, and versions of STBs 110.

Some additional details regarding the system 100, including the manner in which it can collect and use television viewing data can be found in U.S. patent application Ser. No. 11/701,959, filed on Feb. 1, 2007, entitled "Systems and Methods for Measuring, Targeting, Verifying, and Reporting Advertising Impressions"; U.S. patent application Ser. No. 13/081,437, filed on Apr. 6, 2011, entitled "Method and System for Detecting Non-Powered Video Playback Devices"; and U.S. patent application Ser. No. 13/096,964, filed on Apr. 28, 2011, entitled "Method and System for Program Presentation Analysis"; each of which is herein incorporated by reference in its entirety for all purposes. In addition, other problems associated with collected television set top box data, which may additionally be detected and corrected by the data cleaning module 150, are described in an U.S. patent application Ser. No. 13/543,757, filed Jul. 6, 2012, entitled "SYSTEM AND METHOD FOR CLEANING TELEVISION VIEWING MEASUREMENT DATA", hereby incorporated by reference in its entirety for all purposes.

Collection Node-Based Aberrant Viewership

Figure 2:
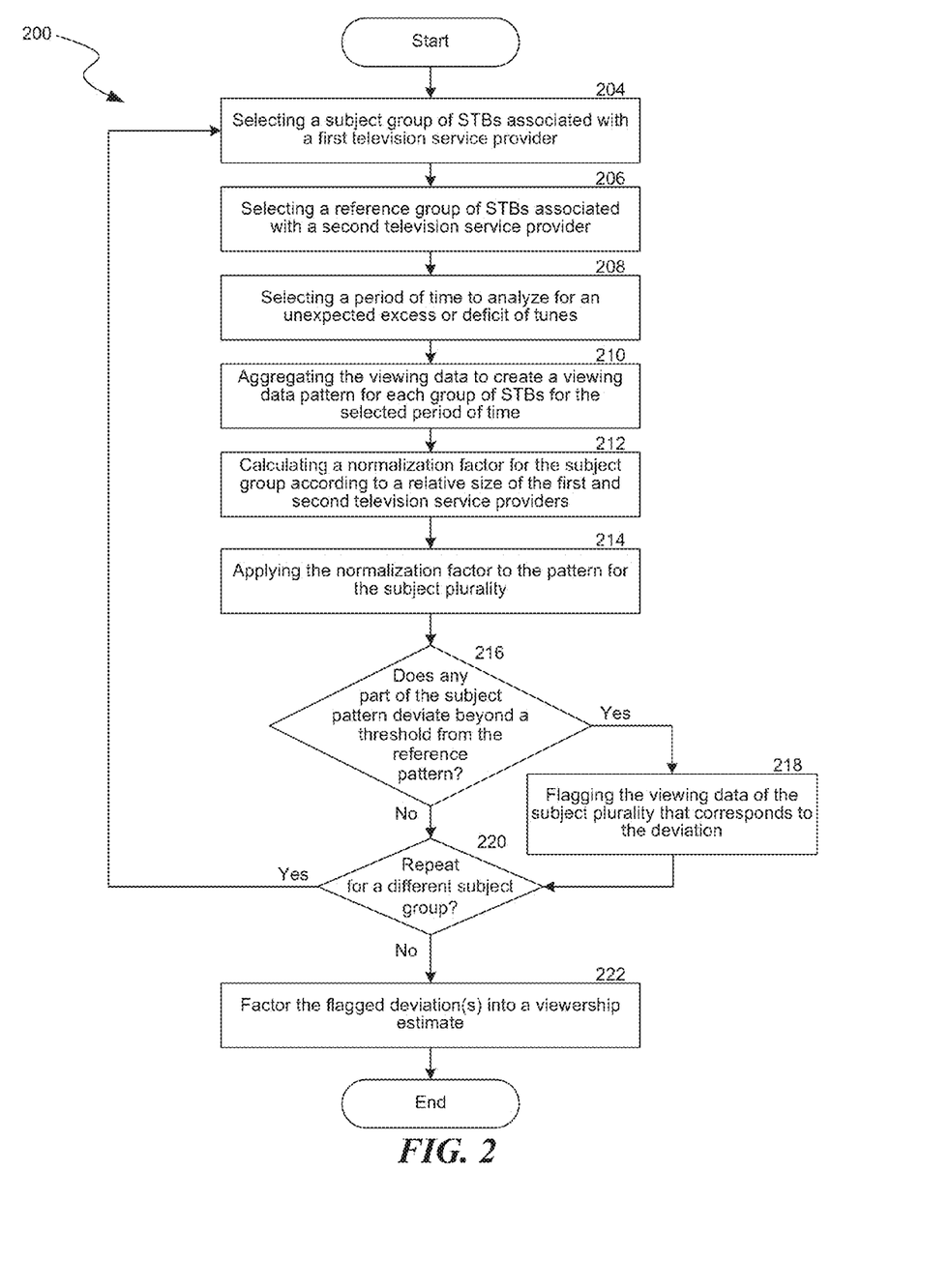
FIG. 2 is a flow diagram illustrating an exemplary process for cleaning television viewing data by detecting and correcting an excess or a deficit in the viewership of a television service provider for a time period.

FIG. 2 is a flow diagram illustrating an exemplary process 200 for cleaning television viewing data by detecting and correcting an excess or a deficit in the viewership of a television service provider for a time period as can be performed by the system 100 in some embodiments. At block 204, the process can select a "subject" group or plurality of STBs associated with a first television service provider. For example, if the first television service provider is the provider 132, then the STBs 110a-110d configured to receive video content from the provider 132 can be selected as the subject group. The selection can be determined based on which STBs are maintained by the first television service provider, or which STBs are configured to send television viewing data to the first television service provider. In some instances STBs configured to send television viewing data and STBs maintained by the first television service provider may be equivalent.

At block 206, the process can select a "reference" plurality or group of STBs associated with a second television service provider. For example, if the cable TV service provider 134 is the second television service provider, then the STBs 110e-110h configured to receive video content from the provider 134 can be selected as the reference group. In some embodiments, different STBs are selected for the reference group than for the subject group.

At block 208, the process can select a period of time to analyze for an unexpected excess or deficit (i.e., an aberration) of television viewership in the subject group of STBs. In some embodiments, the process can automatically select the time period based on newly received television viewing data that has not yet been processed.

At a block 210, the process aggregates the viewing data for the subject group of STBs for the selected period of time to create a "subject" pattern of viewing data. Also, at the block 210, the process aggregates the viewing data for the reference group of STBs for the selected period of time to create a "reference" pattern of viewing data. The aggregated data can simply be a count of the number of set top boxes, households, or other viewing units that reported viewing data for various time subperiods within the selected period of time. For example, if the selected period of time is a specific day, and if the subperiods are each 15 minutes long, then each of the subject and reference patterns will contain 96 subperiods. Alternatively, the aggregated data can be a count of channel-change or other tuning events, collectively referred to as "tunes".

At a block 212, the process can calculate a normalization factor for the subject group of STBs according to the size of the first television service provider in relation to the size of the second television service provider. For example, if the first television service provider has a customer footprint of 1 million set top boxes, and the second television service provider has a customer footprint of 600,000 set top boxes, then the normalization factor can be determined as follows: 600,000/1,000,000=0.6. Alternatively, the normalization factor can be calculated from an expected number of tune events from each television service provider, or by some other function of their reporting magnitude. Furthermore, in some embodiments, there can be a plurality of normalization factors, depending, for example, on the type of STB (STB model, or type, or attributes such as DVR functionality or HD capability) or the type of tuning events (e.g. the system can maintain separate counts for different types of tuning events). In yet another embodiment, the two data sets can both be normalized so that each one has a specified average value (such as 1), so that only relative differences are examined. At a block 214, the process can apply the calculated normalization factor to the viewing data patterns. This normalization can facilitate their subsequent comparison. For example, the subject pattern can be multiplied by the normalization factor to adjust the subject pattern to be directly comparable to the reference pattern.

At a decision block 216, the process can determine whether any portion of the subject pattern deviates from the reference pattern beyond a threshold. The threshold can be predetermined, and may be a fixed percentage of viewers (e.g., 5%), a fixed number of viewers (e.g., 1,000), some combination of both (e.g., 5%+1000), or a Boolean combination of several terms. The threshold can also be based on the count of tuning events rather than the number of viewers, or by some other function of the tuning data. In some embodiments the threshold is determined dynamically. Thus, though referred to as a "threshold" the threshold need not be a single numerical value, but can be a plurality of factors used to assess the subject pattern's deviation from the reference pattern. Alternatively, a statistical procedure can be employed to measure the confidence with which a null hypothesis that the two data patterns are the same can be rejected.

This determination can be performed repeatedly for each time subperiod contained within the patterns. If a determination is made that no portion of the subject patterns deviates from the reference pattern, processing can continue to a decision block 220, as will be described in more detail below. If a determination is made that some portion (e.g., at least one subperiod) of the subject pattern deviates from the reference pattern, processing can continue to a block 218. At the block 218, the process can flag the viewing data of the subject group of STBs that corresponds to the deviation.

In the decision block 220, the process can decide whether to repeat the detection process again from the block 204 for a different subject group. In some embodiments, the detection process can be repeated separately for each television service provider. If the process is to be repeated, some or all of the steps 204-220 can be repeated. If the detection process is not to be repeated, then the process can proceed to block 222. At block 222, one or more flagged deviations can be factored into a viewership estimate or otherwise corrected.

Figure 3:
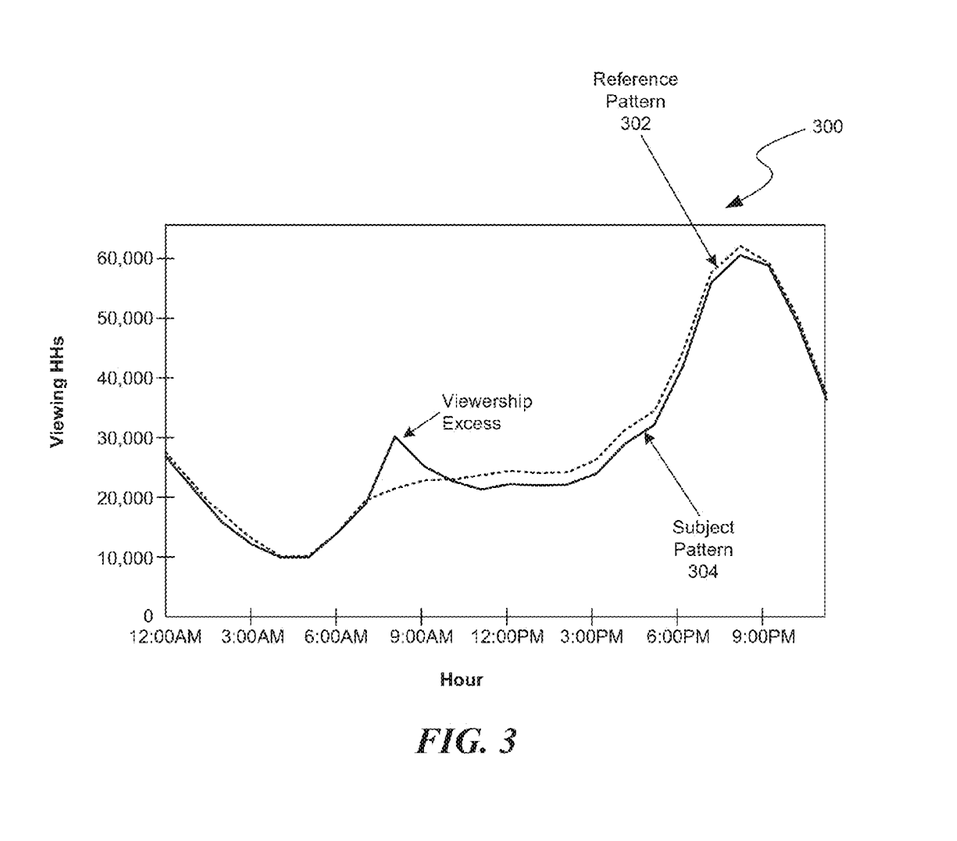
FIG. 3 is a chart illustrating data resulting from an exemplary usage of the process of FIG. 2 to detect an excess in viewership of a television service provider.

FIG. 3 is a chart illustrating data resulting from an exemplary usage of the process of FIG. 2 to detect an excess in viewership of a television service provider. In the specific example of FIG. 3, the process can be used to detect an excess in the viewership of a television service provider occurring around 8:00 AM, within a day-long period that is being analyzed. As shown in FIG. 3, information 300 can pertain to a particular day, e.g., Jun. 4, 2011. A reference pattern 302 and a subject pattern 304 can range from between approximately 10,000 to 60,000 viewing households. One or both of these patterns 302 and 304 can have been normalized (such as in the block 214), so that they can be directly compared for aberrations. In the approximately 1-hour long subperiod around 8:00 a.m., a viewership excess can be detected in the subject pattern 304. In some embodiments, the subject pattern 304 can represent approximately 30,000 viewers, while the reference pattern 302 can represent approximately 21,000 viewers. Therefore, an excess of viewership in the subject group of STBs ranging as high as approximately 9,000 viewers can be detected and corrected during this subperiod.

In some embodiments, the viewership excess (or deficit) can be determined by taking the actual difference and subtracting the maximum difference allowable from the reference pattern according to the threshold. For example, for the illustrated patterns indicated in FIG. 3, if the threshold allowed a deviation of 5,000 viewers (or 23.8%), the excess of viewership can be determined to be 9,000−5,000=4,000. When the subject pattern 304 was normalized by a correction factor (e.g., dividing by the correction factor), the excess (or deficit) of viewership can have the normalization process reversed (e.g., multiplying the excess by the correction factor), to determine the actual correction. It will be understood to one skilled in the art that this example is a very simple one, and that an embodiment could include other, more sophisticated methods of detecting aberrations. For example, the threshold could depend on time, or could take into account the number and types of tuning events, and so forth.

Time Series-Based Aberrant Viewership

Figure 4:
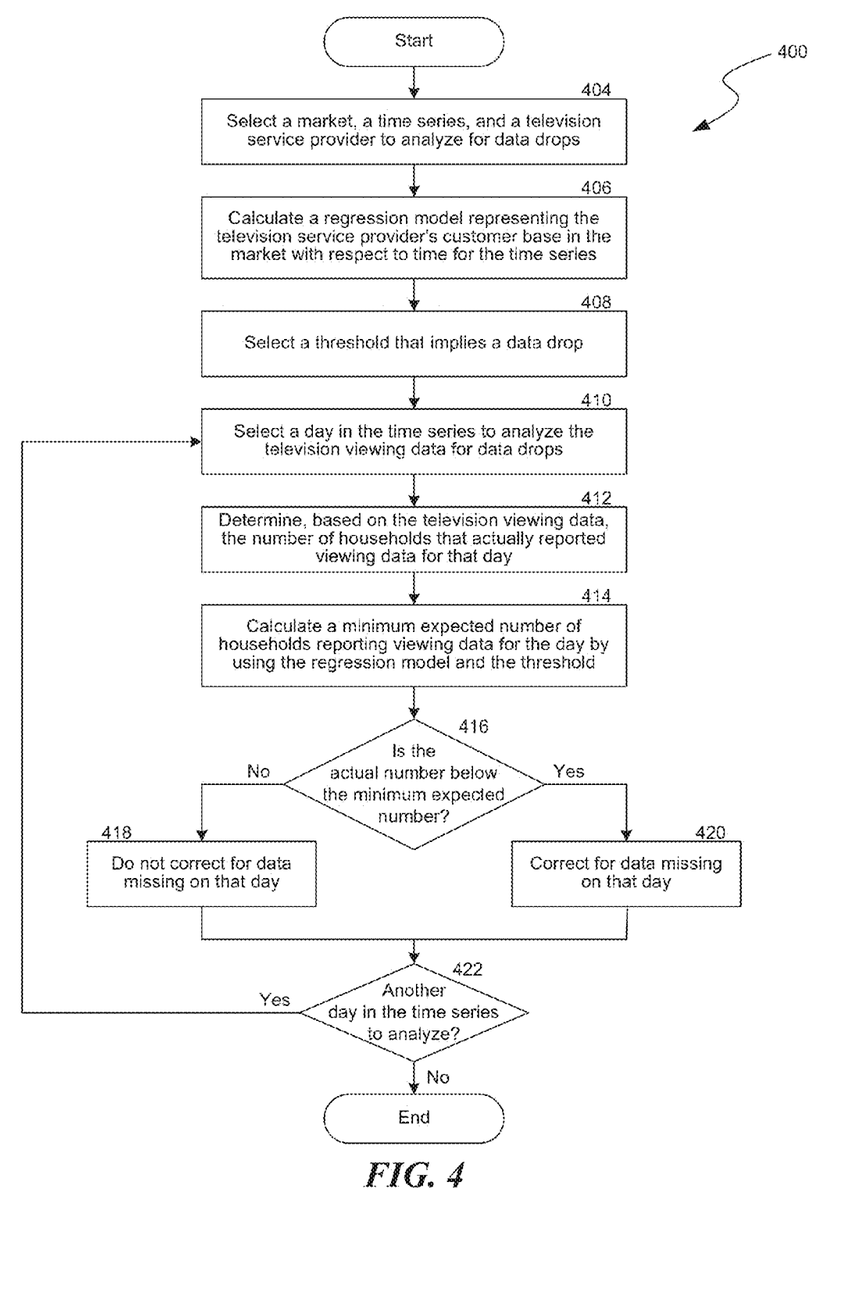
FIG. 4 is a flow diagram illustrating an exemplary process for cleaning television viewing data by using a time series combined with a regression model to detect and correct data drops.

FIG. 4 is a flow diagram illustrating an exemplary process 400 for cleaning television viewing data by using a time series combined with a regression model to detect and correct data drops. The process 400 can be performed by the system 100. As shown in FIG. 4, at a block 404, the process selects a market, a time series, and a television service provider to analyze for data drops. For example, the process can select a "Pacific Time Zone" market, a "Tuesday" time series, and the particular cable TV service provider 134. In other examples, a time series can be selected based on some other day of the week. The term "market" is often used in a specific sense in the television industry, but will be understood herein to further include a geographic area, such as a geographic area represented by a time zone, a state, a metropolitan area, a city, a county, a census block group, a ZIP code, a census block, etc.

At block 406, the process can calculate a regression model. The regression model can represent the selected television service provider's customer base in the market with respect to time for at least the selected time series. The calculated regression model can be linear, as will be described in more detail below with respect to FIG. 5. The purpose of the regression model is to account for long-term trends in a television service provider's footprint in the market. For example, one service provider may be steadily losing customers whereas another may be gaining them. The regression model takes these types of trends into account, allowing the system to focus on actual data aberrations as described herein. At block 408, the process selects a viewership threshold indicative of a data drop. In various embodiments, similar to the threshold selected in block 216, the threshold in block 406 can be predetermined, and can be a fixed percentage of viewers (e.g., 5%), a fixed number of viewers (e.g., 1,000), some combination of both (e.g., 5%+1000), or a Boolean combination of several terms. The threshold can be a minimum and/or maximum threshold (e.g. a range) of values about the reference viewing pattern, and may be described as specific numerical values, or as functions of the statistics of the time series, such as the standard deviation of the data residuals around the regression model.

At block 410, a day in the time series can be selected to analyze the television viewing data for data drops. In some embodiments, a range of days for which processing is desired can be accessed. The first day in the range falling within the time series that has not yet been processed can automatically be selected.

At block 412, the process can determine, based on the television viewing data, the number of households (or STBs, or tunes, etc.) that actually reported viewing data for the selected day. This can be performed by aggregating the collected viewing data for the selected day, while counting any household (or other viewing unit, such as a STB, or tuning event) that reported any sort of viewing data for that day.

At block 414, the process can calculate, or otherwise determine, criteria for assessing whether the viewing data represents an aberration. In some embodiments, the process can calculate a minimum expected number of households reporting viewing data for the day by using the regression model and the threshold. In some embodiments, the process can determine a range within which a number of households reporting viewing data is expected.

Thus a minimum expected number, range of households (or other viewing unit, such as STBs), or other criteria for assessing whether the viewing data represents an aberration. This calculation can use the regression model that was calculated at block 406, as well as the threshold selected at the block 408. At decision block 416, the process can determine whether the actual number of viewers (or STBs, or tunes, etc.) is indicative of an aberration, e.g., by exceeding a range, or being below a minimum expected number. If an aberration is not detected, then processing continues to block 418, where the system may not correct for data missing on that day. If an aberration is not detected, then processing continues to a block 420, where the system can correct for data missing on that day. Alternatively, the system can also look for extraneous, rather than dropped, data, in which case it looks for actual number of viewers (or STBs, or tunes, etc.) above a maximum expected number.

After block 418 or 420, processing continues to a decision block 422, where a determination can be made whether to analyze another day in the time series. If another day is to be analyzed, then the processing can return to the block 410. If there are no more days to be analyzed, then the processing ends.

Figure 5:
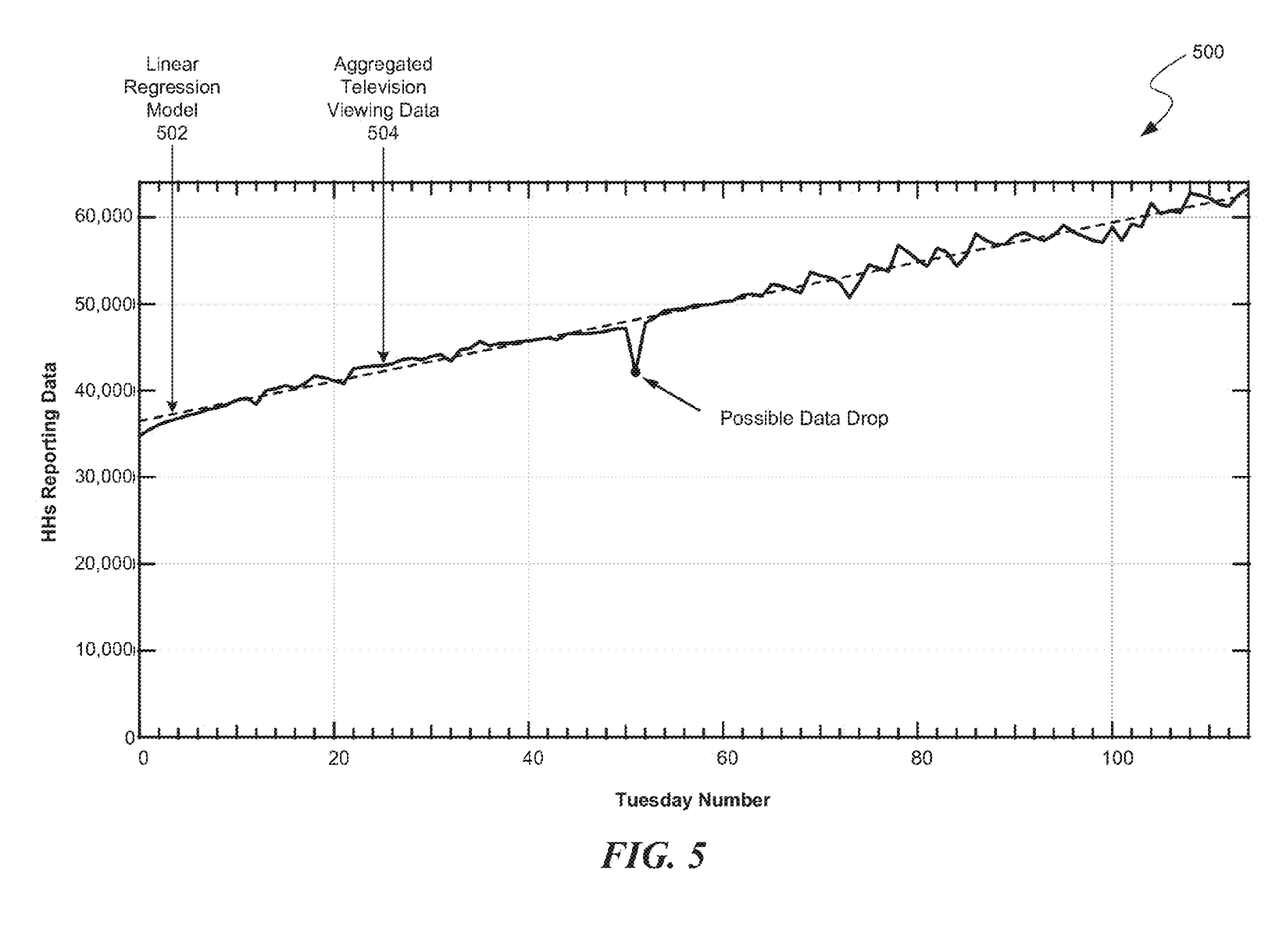
FIG. 5 is a chart illustrating data resulting from an exemplary usage of the process of FIG. 4 to detect a possible data drop occurring in a time series of television viewing data.

FIG. 5 is a chart illustrating data resulting from an exemplary usage of the process of FIG. 4 to detect a possible data drop occurring in a time series 504 of television viewing data, shown plotted against a linear regression model 502. In this example, the regression model 502 and the time series 504 of aggregated television viewing data represent aggregated daily television viewing data for 114 different Tuesdays. In other words, the model 502 and the time series 504 span an approximate 2.2 year time period, and exclude Mondays, Wednesdays, Thursdays, Fridays, Saturdays, and Sundays. In this example, the possible data drop occurring on the 51st Tuesday of the time series 504 can be detectable by using the process 400.

In this example, where the 51st Tuesday is in series 504, the process 400 can use the linear regression model 502 to calculate the number of households expected to report television viewing data on that day. In this example, this is approximately 47,500 households. If the system were to determine a minimum threshold, then the selected threshold that implies a data drop can allow a maximum deviation of 2500 households (or approximately 5%). Consequently, the calculated minimum expected number of households reporting viewing data for the selected day is: 47,500−2500=45,000 households.

In some embodiments, the correction performed in the block 420 can consist of analyzing a predetermined number (e.g., 5) of days in the time series that immediately precede and/or follow the day for which the error was detected, ignoring the lowest and the highest of the calculated viewership numbers for those days, and averaging the calculated viewership numbers of the remainder to determine what viewership number is desirable to correct. One skilled in the art will recognize that there are many possible variations on this algorithm, for example selecting 7 instead of 5, or ignoring the lowest and highest 2 instead of 1, or using other statistical methods to eliminate outliers and measure the expected number.

For example, referring to FIG. 5, if the 51st Tuesday is determined to be a possible data drop, a corrected viewership number could be obtained by taking the numbers of households reporting viewing data for the 45th, 46th, 47th, 48th, 49th, and the 50th Tuesdays, ignoring the lowest and the highest of them, and averaging the remainder. By ignoring the lowest and highest of the group, the system can eliminate nearby statistical outliers in terms of viewing data, such as an atypically popular sporting event like the Super Bowl, from influencing the correction operation. In various embodiments, the correction performed in the block 420 can additionally or alternately consist of utilizing the value of the linear regression model 502 for that day.

Figure 6:
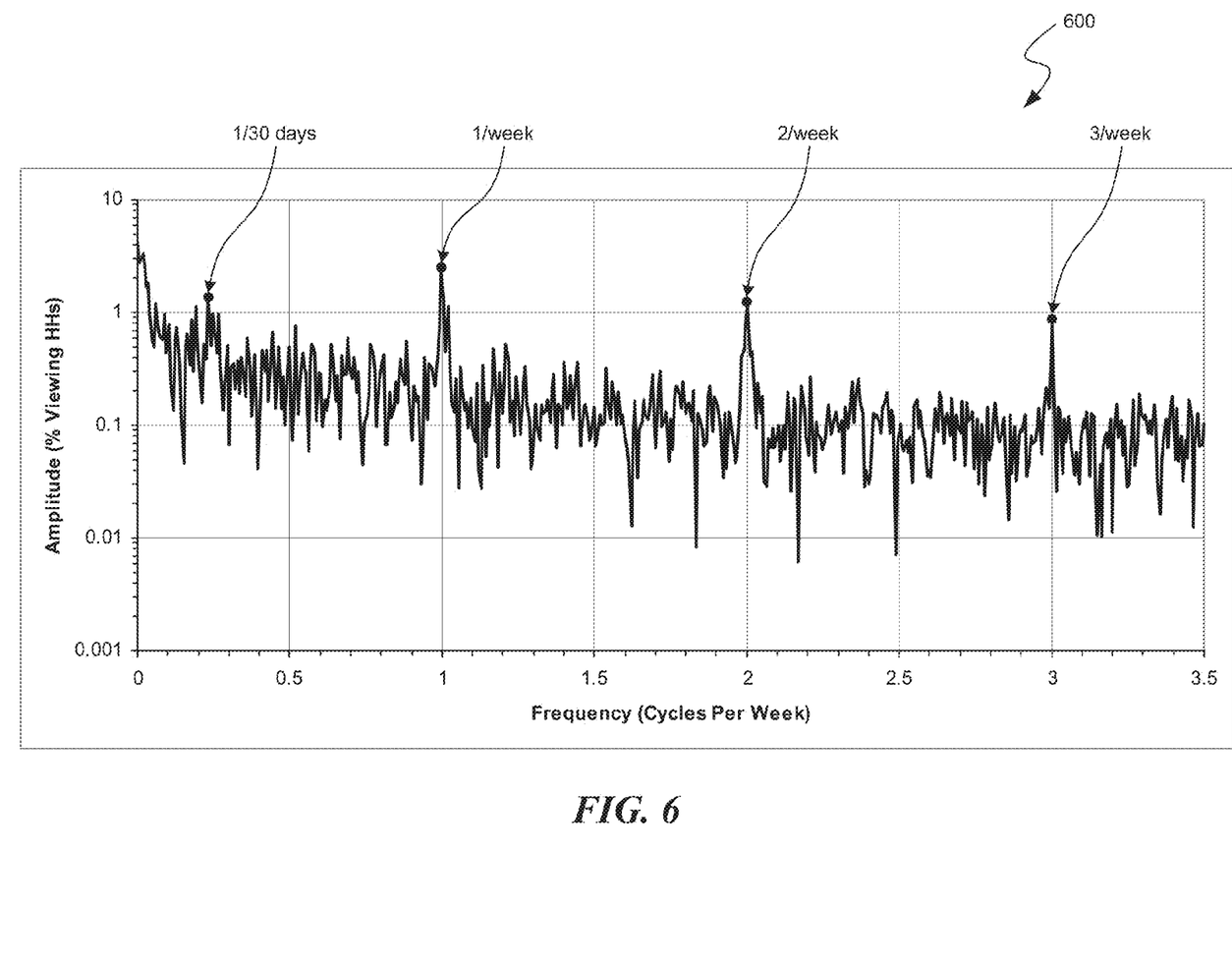
FIG. 6 is a chart illustrating an exemplary Fourier analysis of daily television viewing data suggesting the weekly periodic time period and other intervals that can be effectively utilized by the process of FIG. 4.

FIG. 6 is a chart illustrating an exemplary Fourier analysis of daily television viewing data suggesting the weekly periodic time period and other intervals that can be effectively utilized by the process 400 of FIG. 4. One will recognize that wavelet and other signal processing techniques can be applied in an analogous fashion. Here, a strong amplitude in the percentage of households reporting television viewing data is noticeable at the once per week frequency, as well as the intraweek harmonics of twice per week, and three times per week. Additionally, a lesser amplitude peak is apparent at the frequency occurring every 30 days. Therefore, in alternate embodiments, the process 400 can be altered so that the selected time series, instead of being based on a weekly frequency, can be based on a 30 day frequency (or alternately, on a 31 day or a monthly frequency, or even a quarterly frequency).

Alternate Embodiments

In some embodiments, the process 200 in block 206 automatically and arbitrarily selects a second television service provider that is different from the first television service provider. In some embodiments, the process 200 in block 206 can select the reference group of STBs associated with at least a second television service provider, such as all television service providers for which viewing data is available.

In some embodiments, when processing power and/or storage space allows, the subject and reference data patterns that the process 200 creates in the block 210 can be continuous—i.e., they may have no significantly long subperiod and effectively represent "real time" viewing activity throughout the selected period. In other embodiments, other subperiods, such as one-hour long subperiods, or specific time windows that occur within each day ("dayparts"), and so on, can be utilized. As another example, a seven day long period can be selected for analysis in the block 208, and each subperiod of viewing data stored in the pattern can be one day. In another example, the subperiod can be equal to the period (i.e., each pattern can have only one number of viewers in it.)

In some embodiments, the process 200 can individually normalize both the subject pattern and the reference pattern to a particular, normalized size (e.g., to normalize the patterns so that they are representative of a single viewer, or alternately, 10,000 viewers, etc.). The normalized size can be predetermined in some embodiments by the system or by a user. In yet another alternate embodiment, the process 200, in the blocks 212 and 214, can normalize the reference pattern to make it comparable to the subject pattern, rather than vice versa.

In some embodiments, instead of the process 200 selecting the subject and reference pluralities of STBs corresponding to a first and second television service provider in the blocks 204 and 206, the process 200 can select the pluralities according to which other collection node was utilized. For example, which regional head end (e.g. the head end 124a, or the head end 124b), which satellite (e.g., the satellite 122a, or the satellite 122b), or which data warehouse can determine the selected subject and reference pluralities of STBs, rather than the associated television service provider.

In some embodiments, the correction of aberrant viewership in the process 200 can be performed directly on the viewing data as soon as the aberration is detected, in addition or alternately to the aberration being flagged. Likewise, the correction of aberrant viewership in the process 400 can be flagged for correction later on, rather than being corrected as shown in the block 420.

In some embodiments, the process 400 can calculate in block 406 a regression model that is nonlinear. For example, the regression model can be a sigmoid function that is "S-shaped", or a polynomial function, and so on. The particular function to be used may be determined by a user of the system upon visual inspection of the time series, or it may be selected automatically using any of several methods known in the art. In some embodiments, the process 400 can select the time series in the block 404 containing more than one of the days of the week. For example, Saturdays combined with Sundays can form the basis of a selected time series excluding Mondays through Fridays. Other combinations of days of the week, such as Mondays, Tuesdays, Wednesdays, Thursdays, and Fridays, or Mondays, Wednesdays, and Fridays, are also possible.

Although not shown for the sake of brevity in FIG. 4, various steps can also be repeated, or performed in a different order than depicted, in some embodiments. For example, repeating to the block 404 can occur, in order to select another market, another time series, or another television service provider to analyze for data drops. In some embodiments, different time series can be selected until all desired days to analyze for data drops are processed. For example, after processing Mondays, Tuesdays could be processed, and after processing Tuesdays, Wednesdays could be processed, and so on, until all days of the week are processed when desired.

In some embodiments, the regression model that is calculated in the block 406, or other potentially processor-intensive tasks can be saved, e.g., in the storage device 104, for repeatedly reuse without requiring that they be recalculated. Similarly, the system 100 can save other selections, aggregations, calculations, and determinations performed by the television viewing data cleaning component 150, so that, for example, subsequently collected television viewing data can be rapidly cleaned, in preparation for analysis by the television viewing data analysis component 160.

In some embodiments, one or more selections performed in the processes 200 and 400 can be manually specified by a user of the system 100. For example, the user can specify parameters in a configuration file or graphical user interface drop down menu, or text box. The manually specified parameters may include, for example, which television service providers, which data collection or television distribution nodes, which pluralities of set top boxes, which periods of time, which normalization factors (or which size measurements to be used for calculating normalization factors), which markets, which time series, which regression model types, which thresholds implying a data drop, and which other configuration parameters the system 100 should use for detecting and correcting aberrant television viewership or performing other television viewing data cleaning or analysis. Furthermore, the system for manual user specification can include graphical presentation of the data to help guide the user in setting the various parameters. In some embodiments, thresholds, such as the threshold used in the block 216 and the threshold selected in the block 408 can be determined to provide a specific likelihood or margin of error, such as an error detection rate of approximately 2%, or to detect statistical outliers, e.g., those that depart from the mean of a normal distribution by approximately 2-3 standard deviations.

In some embodiments, humans will be involved in the process before a detected error is corrected. For example, a human operator could review the detected error for verification, prior to allowing the system to perform any correction. In some embodiments, different error correction steps can be performed than those disclosed in FIGS. 2 and 4. For example, some or all data associated with the errors can be ignored or discarded.

In some embodiments, additional steps for cleaning television viewing data can be performed by the system 100. For example, other cleaning techniques or methods for filtering television viewing data could be performed by the system 100 in addition to the cleaning processes 200 and 400. For example, television off detection could be implemented by the system 100 and performed before the processes 200 and 400. These cleaning, filtering, and processing steps can be performed in series or even in some cases, in parallel. For example, all data for which errors are detected by multiple processes running in parallel could be flagged by those processes, and when all processes are done running, the correction of any flagged problems would be performed at the end—perhaps after being reviewed and guided by a human user.

Although not required, aspects and embodiments of the invention utilize the general context of computer-executable instructions, such as routines executed by a general-purpose computer, e.g., a server or personal computer. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured or constructed to perform one or more of the computer-executable instructions explained in detail herein. Indeed, the term "computer", as used generally herein, refers to any of the above devices, as well as any data processor or any device capable of communicating with a network, including consumer electronic goods such as game devices, cameras, or other electronic devices having a processor and other components, e.g., network communication circuitry.

The invention can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines can be located in both local and remote memory storage devices.

In general, the detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

These and other changes can be made to the invention in light of the above Detailed Description. While the above description details certain embodiments of the invention and describes the best mode contemplated, no matter how detailed the above appears in text, the invention can be practiced in many ways. Details of the invention may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

We claim:

1. A computer-implemented method for detecting and correcting a viewership aberration, the method comprising:
    selecting a first dataset corresponding to a first plurality of set top boxes associated with a first service provider;
    selecting a second dataset corresponding to a second plurality of set top boxes associated with at least a second service provider, the second service provider different from the first service provider, the second plurality of set top boxes different from the first plurality of set top boxes;
    aggregating the first dataset across the first plurality of set top boxes to create a first viewing data pattern for a selected period of time;
    aggregating the second dataset across the second plurality of set top boxes to create a second viewing data pattern for the selected period of time;
    identifying a deviation in the first viewing data pattern relative to the second viewing data pattern using a criterion, wherein the criterion comprises a minimum viewership threshold; and
    calculating a corrected viewership estimate based on the deviation.

2. The computer-implemented method of claim 1, wherein identifying a deviation further comprises:
    identifying a portion of the first viewing data pattern that is less than the threshold relative to the second viewing data pattern.

3. The computer-implemented method of claim 1, wherein the criterion comprises a relationship between the first viewing data pattern and a regression model, wherein the regression model is calculated from historic viewing data weighted according to a periodically recurring time period.

4. The computer-implemented method of claim 1, further comprising:
    normalizing at least one of the first viewing data pattern and the second viewing data pattern so that the first viewing data pattern and the second viewing data pattern are comparable.

5. The computer-implemented method of claim 1, further comprising:
    calculating a normalization factor according to at least a relationship of a size associated with the first service provider compared to a size associated with the second service provider;
    applying the normalization factor to the first viewing data pattern and the second viewing data pattern to make them comparable when the service providers have different customer footprints; and
    if a deviation was determined, flagging the deviation for factoring into the calculation of the corrected viewership estimate.

6. A non-transitory computer-readable medium comprising instructions executable by at least one processor to perform a method comprising:
  selecting a first dataset corresponding to a first plurality of set top boxes associated with a first service provider;
  selecting a second dataset corresponding to a second plurality of set top boxes associated with at least a second service provider, the second service provider different from the first service provider, the second plurality of set top boxes different from the first plurality of set top boxes;
  aggregating the first dataset across the first plurality of set top boxes to create a first viewing data pattern for a selected period of time;
  aggregating the second dataset across the second plurality of set top boxes to create a second viewing data pattern for the selected period of time;
  identifying, a deviation in the first viewing data pattern relative to the second viewing data pattern using a criterion, wherein the criterion comprises a minimum viewership threshold; and
  calculating a corrected viewership estimate based on the deviation.

7. The non-transitory computer-readable medium of claim 6, wherein identifying a deviation comprises:
  identifying a portion of the first viewing data pattern that falls beneath the threshold relative to the second viewing data pattern.

8. The non-transitory computer-readable medium of claim 6, wherein the criterion comprises a relationship between the first viewing data pattern and a regression model, wherein the regression model is calculated from historic viewing data weighted according to a periodically recurring time period.

9. The non-transitory computer-readable medium of claim 6, the method further comprising:
  normalizing at least one of the first viewing data pattern and the second viewing data pattern so that the first viewing data pattern and the second viewing data pattern are comparable.

10. The non-transitory computer-readable medium of claim 6, the method further comprising:
  calculating a normalization factor according to at least a relationship of a size associated with the first service provider compared to a size associated with the second service provider;
  applying the normalization factor to the first viewing data pattern and the second viewing data pattern to make them comparable when the service providers have different customer footprints; and
  if a deviation was determined, flagging the deviation for factoring into the calculation of the corrected viewership estimate.

11. A system for detecting and correcting a viewership aberration, the system comprising:
  a storage comprising set top box data;
  at least one processor;
  a memory comprising instructions executable by the at least one processor to:
  select a first dataset corresponding to a first plurality of set top boxes associated with a first service provider from the storage;
  select a second dataset corresponding to a second plurality of set top boxes associated with at least a second service provider from the storage, the second service provider different from the first service provider, the second plurality of set top boxes different from the first plurality of set top boxes;
  aggregate the first dataset across the first plurality of set top boxes to create a first viewing data pattern for a selected period of time;
  aggregate the second dataset across the second plurality of set top boxes to create a second viewing data pattern for the selected period of time;
  identify a deviation in the first viewing data pattern relative to the second viewing data pattern using a criterion, wherein the criterion comprises a minimum viewership threshold; and
  calculate a corrected viewership estimate based on the deviation.

12. The system of claim 11, wherein identifying a deviation comprises:
  identifying a portion of the first viewing data pattern that falls beneath the threshold relative to the second viewing data pattern.

13. The system of claim 11, wherein the criterion comprises a relationship between the first viewing data pattern and a regression model, wherein the regression model is calculated from historic viewing data weighted according to a periodically recurring time period.

14. The system of claim 11, the instructions further configured, in conjunction with the at least one processor, to:
  normalize at least one of the first viewing data pattern and the second viewing data pattern so that the first viewing data pattern and the second viewing data pattern are comparable.

15. The system of claim 11, the instructions further executable by the at least one processor to:
  calculate a normalization factor according to at least a relationship of a size associated with the first service provider compared to a size associated with the second service provider;
  apply the normalization factor to the first viewing data pattern and the second viewing data pattern to make them comparable when the service providers have different customer footprints; and
  if a deviation was determined, flag the deviation for factoring into the calculation of the corrected viewership estimate.

* * * * *